United States Patent
Belfer et al.

(10) Patent No.: US 7,721,958 B2
(45) Date of Patent: May 25, 2010

(54) COINLESS VENDING SYSTEM, METHOD, AND COMPUTER READABLE MEDIUM USING AN AUDIO CODE COLLECTOR AND VALIDATOR

(75) Inventors: Ellis Samuel Belfer, Dallas, TX (US); Art Holguin, Plano, TX (US)

(73) Assignee: Alcatel Lucent, Paris (FR)

( * ) Notice: Subject to any disclaimer, the term of this patent is extended or adjusted under 35 U.S.C. 154(b) by 820 days.

(21) Appl. No.: 11/231,406

(22) Filed: Sep. 21, 2005

(65) Prior Publication Data
US 2007/0063027 A1 Mar. 22, 2007

(51) Int. Cl.
*G06K 7/08* (2006.01)
(52) U.S. Cl. .......................... 235/381; 222/2; 455/414.1
(58) Field of Classification Search ......... 235/380–382; 222/2; 221/9–10; 705/39, 40; 455/414.1–414.4; 380/277–286; 713/150–181
See application file for complete search history.

(56) References Cited

U.S. PATENT DOCUMENTS

| 4,120,452 A * | 10/1978 | Kimura et al. .............. 235/381 |
| 6,584,309 B1 * | 6/2003 | Whigham ..................... 705/16 |
| 7,085,556 B2 * | 8/2006 | Offer .......................... 235/381 |
| 7,181,629 B1 * | 2/2007 | Hatanaka et al. ............ 713/189 |
| 2002/0059148 A1 * | 5/2002 | Rosenhaft et al. ............. 705/77 |
| 2003/0014315 A1 * | 1/2003 | Jaalinoja et al. .............. 705/18 |
| 2003/0061493 A1 * | 3/2003 | Angelo et al. ............... 713/189 |
| 2004/0089669 A1 * | 5/2004 | Garratt .......................... 221/1 |

FOREIGN PATENT DOCUMENTS

| EP | 1104973 A1 | 6/2001 |
| WO | 0145058 A1 | 6/2001 |

* cited by examiner

*Primary Examiner*—Seung H Lee
*Assistant Examiner*—Christle I Marshall
(74) *Attorney, Agent, or Firm*—RG & Associates LLC

(57) ABSTRACT

A system, method, and computer readable medium, wherein a vending machine comprising an audio code collector and a code validator is adapted to receive audio tones from a mobile device, and wherein the audio tones include authentication codes and dispense codes to control dispensing of product from the vending machine.

19 Claims, 4 Drawing Sheets

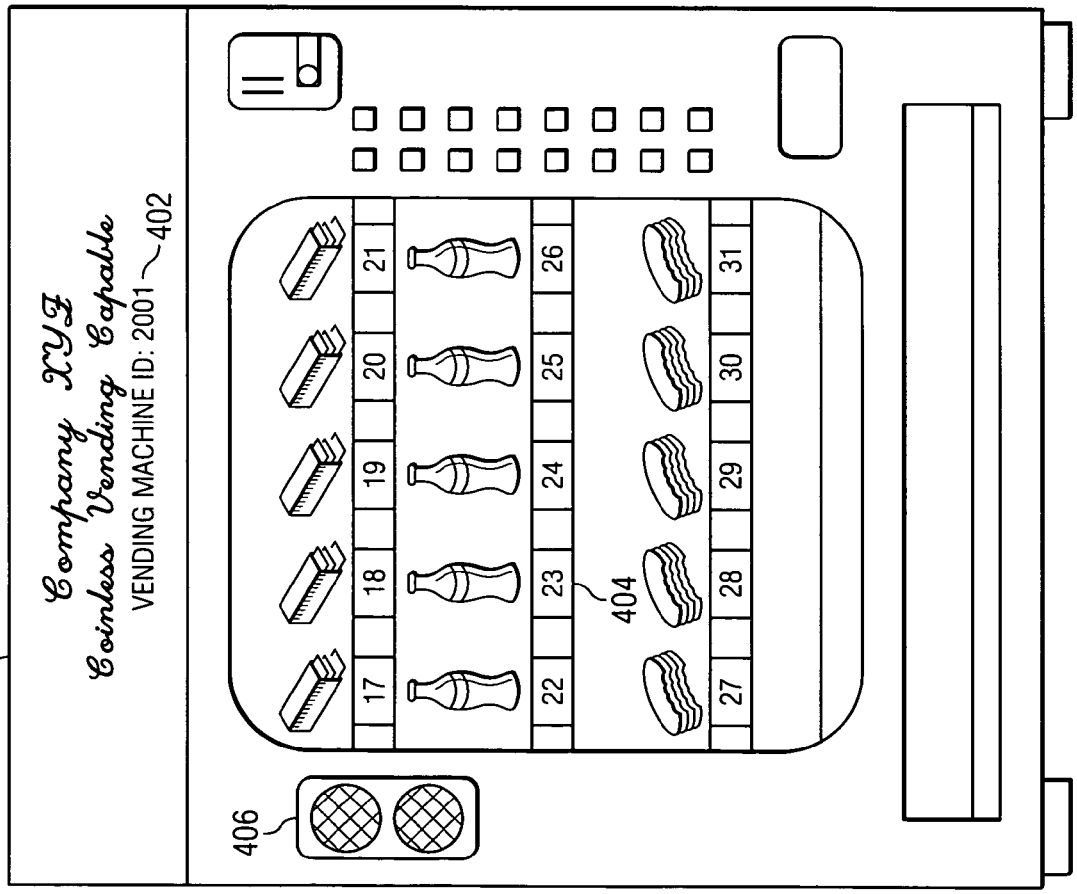

COINLESS VENDING SYSTEM, METHOD, AND COMPUTER READABLE MEDIUM USING AN AUDIO CODE COLLECTOR AND VALIDATOR

BACKGROUND OF THE INVENTION

The present invention describes a system, method, and computer readable medium by which a consumer can purchase vending machine content via a consumer's mobile phone interfaced to a vending machine equipped with an Audio Code Collector and Validator (ACCV) system.

The consumer's mobile phone will interface with both a Billing Server via a wireless cellular network and a vending machine via the ACCV system in order to perform the transaction of purchasing vending machine content.

Current coinless vending machine concepts require vending machines to be interfaced to the cellular network or via the Internet and require special mobile phones. This is not a realistic or cost effective scenario for vending machine placements.

A solution is therefore required that overcomes the limitations of existing coinless vending concepts by providing a system, method, and computer readable medium that allows secure and accountable transactions to occur without a vending machine requiring connection to the Internet or a wireless network.

SUMMARY OF THE INVENTION

The present invention provides an Audio Code Collector and Validator (ACCV) at the vending machine. This device allows any standard mobile phone to interface with the ACCV equipped vending machine via "audio codes" in order to purchase content. Transactions occur between:

the mobile phone via the cellular network to a Billing Server and Verification Database; and the mobile phone to the ACCV via audio interface.

In one embodiment, a system for operation of a vending machine, comprises a vending machine comprising an audio code collector and a code validator adapted to receive audio tones from a mobile device, wherein the audio tones include authentication codes and dispense codes to control dispensing of product from the vending machine.

In another embodiment, a method for purchasing product from a coinless vending machine comprises determining a vending machine identification number and a product identification number, wherein the vending machine includes an audio code collector and validator (ACCV), dialing, via a mobile device, at least one of: a unique set of symbols and a unique set of digits as well as the numbers, that allows a wireless system providing access to the mobile device, to translate the symbols and the digits, and routing the translated symbols and digits as well as the numbers to a verification server.

In a further embodiment, a computer readable medium comprises instructions for: creating a public key in a form of one or more musical tones, wherein the musical tones may be audible or non-audible, and forwarding the musical tones to a Mobile Switching Center along with an indication for the MSC to alert a subscriber to place a mobile device against an acoustic coupler of an audio code collector and validator (ACCV) module in a coinless vending machine, wherein the subscriber may be alerted via a text message or an audible format.

BRIEF DESCRIPTION OF THE DRAWINGS

The unique features of the invention are set forth in the appended claims. The invention itself, however, as well as a preferred mode of use and advantages thereof, is best understood by reference to the following detailed description of an illustrative embodiment when read in conjunction with the accompanying drawings:

FIG. 4 is a drawing of a coinless vending machine in accordance with the preferred embodiment of the present invention; and FIG. 5 is an example of what a typical call detail record would look like in accordance with the preferred embodiment of the present invention.

DETAILED DESCRIPTION OF THE INVENTION

Figure 1:
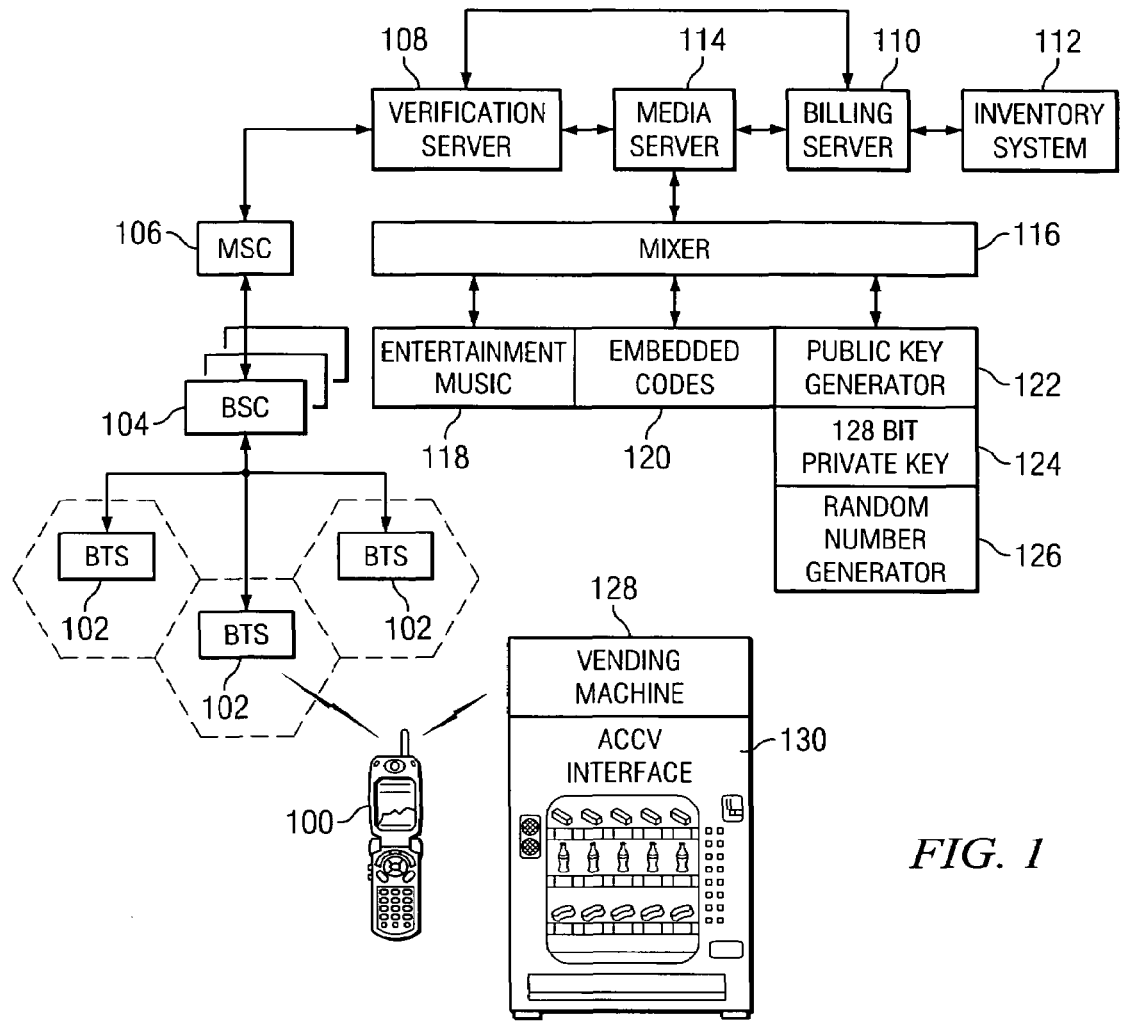
FIG. 1 is a block diagram of a wireless communication system depicted in accordance with a preferred embodiment of the present invention.

With reference to the figures and in particular with reference to FIG. 1, a diagram of a wireless communication system is depicted in accordance with a preferred embodiment of the present invention. In the interest of clarity, only one such wireless system is depicted (although a plurality of wireless and non-wireless systems may be utilized with the present invention) with only a representative sample of subsystems representing this system. The wireless system depicted can be any form of wireless technology and is not limited to a specific type of technology. The wireless system depicted in FIG. 1 is representative of a code division multiple access (CDMA) system.

The depicted example of a wireless system in FIG. 1 includes a mobile switching center (MSC) (106) coupled to multiple base station controllers (BSC) (104). A typical base station controller will have multiple base transceiver stations (BTS) (102) coupled to it. Interfacing with each base transceiver station (BTS) (102) will be multiple wireless mobile devices (100). These wireless mobile devices interface with the base transceiver stations via radio frequency (RF). The radio frequency interface between a mobile station and a base transceiver station is capable of transponding both bearer and signaling information. Bearer information will be in the form of either voice processing or data transaction processing. Voice processing can be either in the form of actual voice communication or tones such as dual tone multi frequency (DTMF) sequences. Data transaction processing can be in the form of both circuit switched data transactions as well as packetized data transactions. Signaling processing will be in the form of control messaging between the two devices in order to inter-operate and communicate appropriately. Signaling messages are capable of being sent on both control channels and traffic channels and are capable of being sent simultaneously with bearer traffic while on a traffic channel.

In continuing to reference FIG. 1, the mobile switching center (MSC) (106) is also coupled to a verification server (108). The Verification Server (108) interfaces with both a Billing Server (110) and a Media Server (114). The Billing Server is coupled to an Inventory System Controller (112). This Inventory System Controller (112) can reside on the Billing Server as a software entity or can reside on a separate, external server. The Media Server (114) compromises several key aspects to the preferred embodiment of the present invention. The media server (114) compromises a Mixer (116) which combines several pieces of key information together for exchange over the wireless system. The mixer (116) gets information from and sends information to an entertainment music module (118), an embedded codes module (120), and a public key generator (122). The public key generator contains the ability to generate both public and private keys as well as supplying the random number generator function for the present invention.

Figure 2:
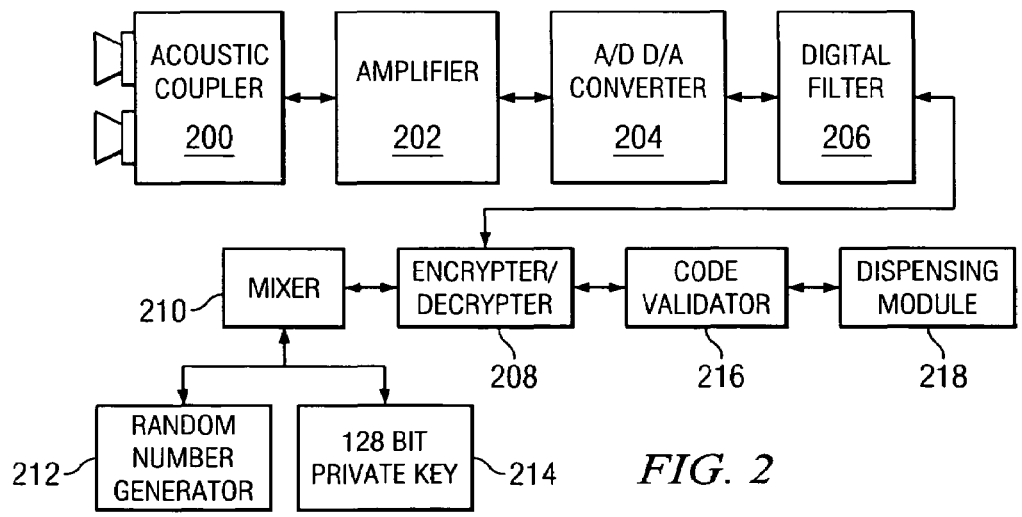
FIG. 2 is a block diagram of an audio code collector and validator (ACCV) depicted in accordance with a preferred embodiment of the present invention.

With reference now to FIG. 2, a block diagram of an audio code collector and validator (ACCV) is depicted in accordance with a preferred embodiment of the present invention. These blocks or module are hardware, software, firmware, and/or a combination of hardware, software, and/or firmware. An audio code collector and validator (ACCV) supplies the interface to a typical vending machine. The acoustic coupler (200) is a device that allows the audio code collector and validator (ACCV) to couple with a wireless mobile device (100 of FIG. 1) via audio interfacing. The acoustic coupler (200) will contain a microphone (216) and a speaker (218). The acoustic coupler will be a device that will reside externally to the vending machine so that a wireless mobile device (100 of FIG. 1) can interface to it. The acoustic coupler (200) will pass audio sent from the wireless mobile device (100 of FIG. 1) to the ACCV and send audio signals from the ACCV to the wireless mobile device (100 of FIG. 1). The acoustic coupler (200) will interface with an amplifier module (202) for appropriate amplification and filtering of the audio signals. The amplifier (202) will then pass the appropriate audio signals at the required quality and audio levels to an analog to digital/digital to analog converter (204). The analog to digital/digital to analog converter (204) converts an analog, audio signal to a digital bit stream. This bit stream is then forwarded to a digital filter (206). After the appropriate filtering of the digital stream is completed, the bit stream is sent to an encrypter/decrypter (208). The encrypter/decrypter module pulls the necessary bits from the bit stream for processing and comparison with its associated private key information. The Encrypter/Decrypter (208) works with a mixer module (210), a random number generator module (212), and a 128 bit private key module (214) in order to encrypt or decrypt the associated bit stream for processing. Once the appropriate information has been retrieved from the bit stream, the information is forwarded to the Code Validator (216) for final processing and decision making. Depending of the validity of the information obtained, the code validator (216) will forward information to a dispensing module (218). This module interfaced directly with the vending machine in supplying information to appropriately dispense the specific product purchased.

Figure 3A:
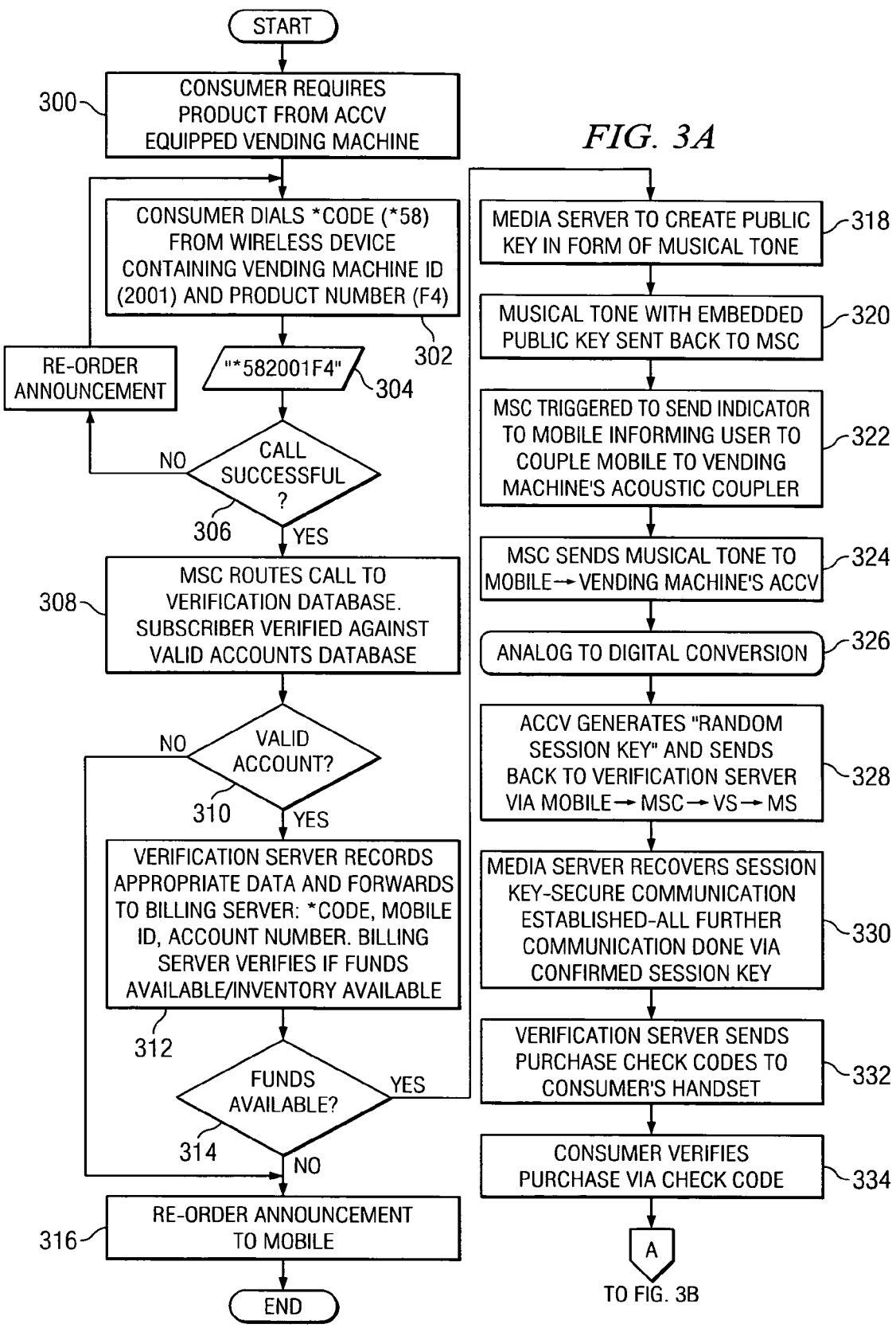
FIG. 3 is a flowchart of a process for coinless vending operation in accordance with the preferred embodiment of the present invention.
Figure 3B:
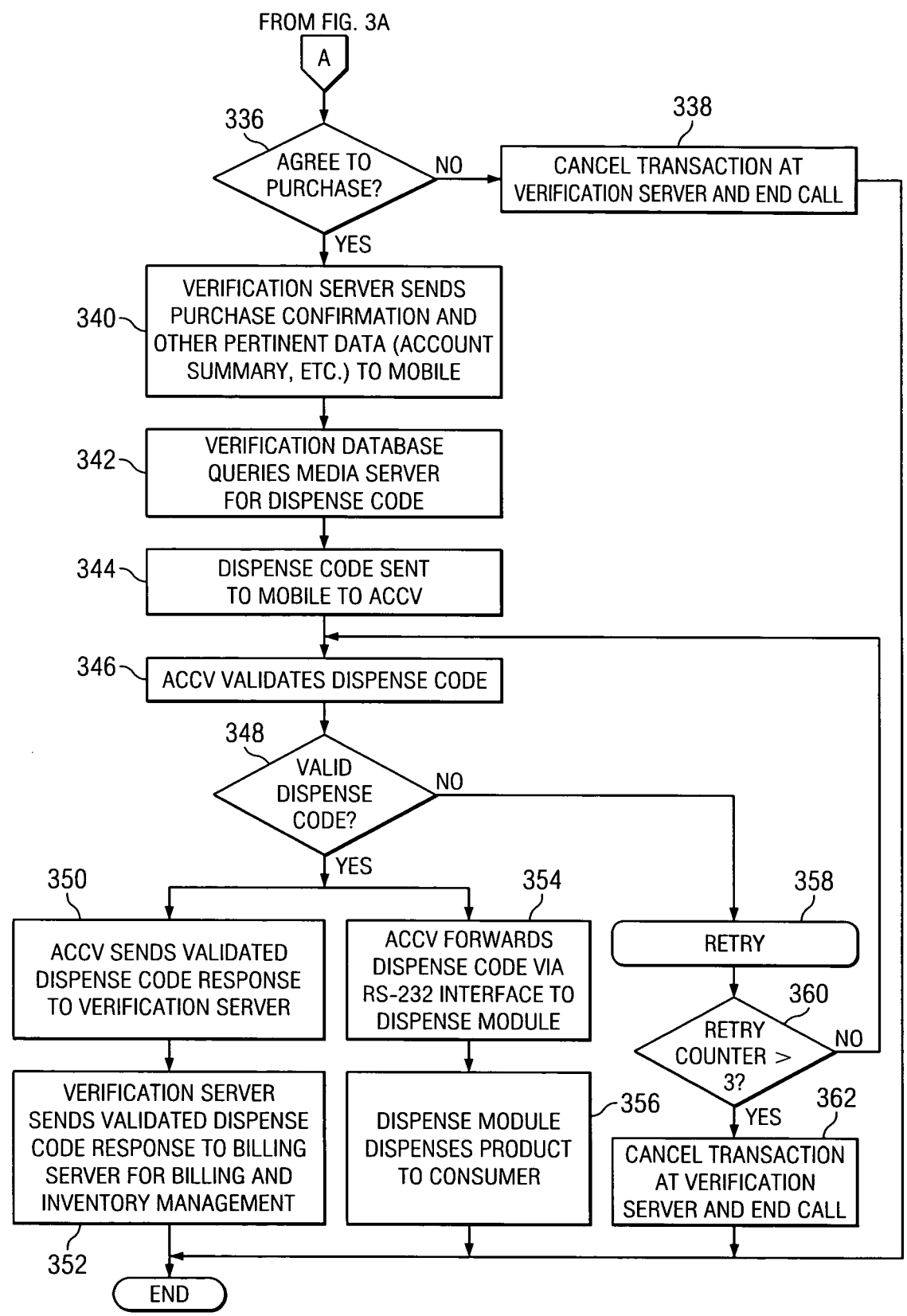

With reference now to FIG. 3, a flowchart of a complete process for purchasing vending machine content through the audio code collector and validator (ACCV) is depicted in accordance with a preferred embodiment of the present invention. This process begins with a consumer requiring the need to purchase vending machine content from an ACCV equipped vending machine (step 300) via the consumer's wireless mobile device. It is assumed that the consumer has already established an appropriate billing account with the service provider providing the coinless vending machine service and that appropriate funds or credit information is on hand with the service provider in order for the consumer to successfully perform the transaction. An example of a typical vending machine equipped with an audio code collector and validator (ACCV) and having the appropriate product codes and machine identification code is illustrated in FIG. 4 in accordance with a preferred embodiment of the present invention. A vending machine (400) capable of coinless vending operation will be identified by a unique vending machine identification number (402). Each product located inside the vending machine will also be associated with a product identification number (404). Referring back to FIG. 3, the consumer determines the vending machine identification number (402) consumer is located at and product identification number (404) of product consumer wants to purchase. The consumer then dials a unique set of symbols and digits in order to start the transaction. The number that is dialed from the wireless mobile device can be any set of unique symbols or digits that allows the wireless system and specifically the mobile switching system (MSC) to translate the call appropriately and route it to the verification server. For this illustration, the consumer dials a unique "star" code first [*58] followed by the unique vending machine id (402), followed by the product identification (404). A typical dial string associated with this illustration would appear as "*58200123" (step 304). Once the user completes the originated call from the mobile, the call will be routed over the air interface, through the BTS (102 in FIG. 1), BSC (104 in FIG. 1), and to the MSC (106 in FIG. 1). If call does not successfully get routed to the MSC, the wireless mobile device will supply the appropriate notification to the user that the call will need to be retried. This is illustrated in the negative decision point with respect to FIG. 3 (step 306).

Upon successful initiation of the wireless mobile phone origination with dial string "*58200123", the mobile switching center (MSC) will translate the dialed string appropriately and determine that this unique code [*58] indicates that this is a call associated with a coinless vending machine transaction. MSC will then route the appropriate information to the verification database for further processing (step 308). The data that is routed to the verification database can be in the form of a call detail record (CDR) which is a well defined and a commonly used transaction type in the art. An example of a call detail record (CDR) is illustrated in FIG. 5 in accordance with a preferred embodiment of the present invention. Once the call detail record information is forwarded to the verification server, the verification server then strips out the required information from the CDR for further processing. This information consists of the dialed number (502) in FIG. 5 and the mobile identification number (504) in FIG. 5. The verification server then utilizes this information to verify that the user is a valid subscriber to the coinless vending machine service. This information is compared to the verification server's database of valid subscriber accounts to the service. If the subscriber does not have a valid account on the verification server's database, the process will be halted and the appropriate announcement will be returned to the mobile via the wireless network (step 310—failure and step 316). If the subscriber is confirmed to have a valid account on the verification server (step 310—success), the account number associated with the subscriber, along with the dialed string (502 in FIG. 5) and the mobile identification number (504 in FIG. 5) are forwarded to the billing server for further processing. This is illustrated in step 312 of FIG. 3.

The billing server uses the forwarded information to determine if the subscriber has the appropriate funds in the billing account. This process is done by using the subscriber's account number to search on the billing server's database for the appropriate credit worthiness. If the subscriber does not have the appropriate funds in the database, the process will be halted and an announcement will be returned to the mobile via the wireless network (step 314—failure and step 316). If the subscriber passes the billing server's credit check, the billing server will then gather pricing information based on the product code (404 of FIG. 4) as obtained from the dialed string (502) in FIG. 5.

Continuing to reference FIG. 3, the billing server now forwards a request to the media server to create a public key in the form of a musical tone (step 318). The media server interacts with an embedded codes subsystem to create the public key in the form of musical tones. This musical tone is mixed with entertainment music that resides on the media server. The musical tones that now represent the public key can be audible or non-audible. Audible meaning that the tones can be in the range of 300 to 3000 Hz. Non-audible is outside of this frequency range. All public keys utilized with this present invention will conform to the ANSI X9.19 "American National Standard for Financial Institution Message Encryption: American Bankers Association, 1988 key encryption standard" or "ISO 8730 [ISO87] and ISO 8731". These musical tones that are now embedded in an entertainment music clip, are now forwarded back to the mobile switching center along with an indication for the MSC to alert the mobile user to place the mobile against the acoustic coupler of the audio code collector and validator (ACCV) equipped vending machine (step 320). The method to alert the mobile user can be in the form of a text message or audible format. As depicted in step 322, the mobile switching center (MSC) forwards the alert to the mobile through the BSC and BTS. The mobile user receives the indicator and places the mobile against the acoustic coupler. The MSC now forward the musical tones through the BSC, BTS, and mobile through to the acoustic coupler of the ACCV equipped vending machine (step 324).

This audio information is received by the ACCV module, amplified and filtered appropriately and then forward to the Analog to Digital conversion module (step 326). The Analog to Digital conversion process converts the audio signal to a digital bit stream that is fed to an Encrypter/Decrypter module. The Encrypter/Decrypter module retrieves the Public Key that is embedded in the digital bit stream. Utilizing the retrieved Public Key, the Encrypter/Decrypter generates a Random Session Key. The Random Session Key is sent back through the ACCV, mobile, and MSC as an audio signal to the Verification Server. The Verification Server forwards this information to the Media Server. This step of the process is depicted in step 328. The Media server converts the audio signal to a digital bit stream and recovers the session key using its stored private vending machine key. Upon recovering the session key, the Media Server and Vending Machine ACCV module can now have secured communication via the use of this session key (step 330). The Media Server informs the Verification Server of the Session Key to use for further processing.

As illustrated in step 332 of FIG. 3, the Verification Server now sends a Purchase Check Code to the mobile user/mobile device. This information can be in the form of a voice or text message. This will inform the mobile user that the mobile can be removed from the acoustic coupler for confirmation of the purchase being requested. The mobile user will be asked to confirm the purchase (step 334). The purchase confirmation can again be in the form of an audio tone or text message response. If the confirmation from the mobile is not received in set period of time configured on the Verification Server or if the Purchase Check code is a negative response, the transaction will be canceled at that point (step 336—failure and step 338). If the confirmation is received at the Verification Server prior to the timeout period and is a positive confirmation, the Verification Server queries the Billing Server for product code billing information. The Billing Server supplies a cost associated with a desired purchased product to the Verification Server. The Verification Server sends purchase confirmation message to mobile in the form of voice or text message (step 340). The purchase confirmation message will contain information about the purchase cost, account information, and optional marketing/promotional type information. This message will also inform the mobile user to place the mobile back against the acoustic coupler for final transaction.

The Verification Server, after sending purchase confirmation message, will query the media Server for a valid Dispense Code (step 342). The Media Server will embed this Dispense Code into an audio signal and forward on to the ACCV Module (step 344). The ACCV module's acoustic coupler will receive this information and process it through to the encrypter/decrypter for validation (step 346). If the encrypter/decrypter cannot decipher a valid dispense code (step 348—failure), it will send a retry indication back to the Media Server (step 358). The Verification server will be configurable to accept and process multiple retries before failing the transaction (step 360 and 362). Upon successful decipher of valid dispense code (step 348—success), encrypter/decrypter forwards Dispense Code to Dispensing Module (step 354) for proper dispensing of product to consumer (step 356). At the same time, the ACCV sends the validated Dispense Code response back to the Verification Server for final transaction processing (step 350). The Verification Server then sends validated Dispense Code response to Billing Server for finalization of billing and inventory management. The consumer's account is then billed (step 352).

Although an exemplary embodiment of the system, method, and computer readable medium of the present invention has been illustrated in the accompanied drawings and described in the foregoing detailed description, it will be understood that the invention is not limited to the embodiments disclosed, but is capable of numerous rearrangements, modifications, and substitutions without departing from the spirit or scope of the invention as set forth and defined by the following claims. For example, the capabilities of the system of the present invention can be performed by one or more of the modules or components described herein or in a distributed architecture. For example, all or part of the functionality performed by the mobile device 100, the BTS 102, the BSC 104, the MSC 106, the verification server 108, the billing server 110, the inventory system 112, the media server 114, the mixer 116, the entertainment music module 118, the embedded codes module 120, the public key generator 122, the private key 124, the random number generator 126, the vending machine 128, and the ACCV 130 may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless source, a wired source and/or via plurality of protocols. Still further, the mobile device 100 may be a cellular phone, a computer or any type of device able to receive and send a message. Also, the messages sent or received by any of the modules may be sent or received directly and/or via one or more of the other modules or nodes (not shown).

What is claimed is:

1. A system for operation of a vending machine, comprising:
   a vending machine comprising:
   an audio code collector and a code validator (ACCV) adapted to receive one or more audio tones from a mobile communication device, wherein the audio tones include one of a public key and a dispense code embedded in the audio tones, wherein the ACCV, generates a random session key based on the public key to establish a secure communication between the ACCV and a media server utilizing the random session key, and
   validates the dispense code to dispense the purchased product from the vending machine.

2. The system of claim 1 comprising a media server adapted to receive a request from the mobile communication device, wherein the request includes an identifier of the vending machine and a code of the product.

3. The system of claim 2, wherein the media server, based on the request, verifies billing, authenticates the vending machine and transmits audio codes to the mobile communication device for authentication of the vending machine and dispensing of the product.

4. The system of claim 1, wherein the vending machine is not connected to the Internet.

5. The system of claim 2, wherein the media server receives the request from the mobile communication device through a wireless network.

6. A computer readable medium that provides instructions which, when executed by a computer, cause the computer to perform operations comprising:
   creating a public key in a form of one or more musical tones, wherein the musical tones may be audible or non-audible; and
   forwarding the musical tones to a Mobile Switching Center along with an indication for the MSC to alert a subscriber to place a mobile device against an acoustic coupler of an audio code collector and validator (ACCV) module in a coinless vending machine, wherein the subscriber may be alerted via a text message or an audible format.

7. A method of purchasing a product from a coinless vending machine, comprising:
   receiving a public key in an audio code collector and validator (ACCV) of a vending machine from a mobile communication device, the public key being embedded in one or more musical tones, the public key being generated by a media server and being communicated from the media server to the mobile communication device through a cellular telephone network in response to a vending request for the purchase of a product from the vending machine being communicated by the mobile communicating device to the media server through the cellular telephone network;
   generating a random session key in the ACCV based on the public key;
   communicating the random session key as an audio signal from the ACCV to the media server through the mobile communication device, the audio signal with the random session key being communicated from the mobile communicating device to the media server through the cellular telephone network; and
   establishing a secure communication between the ACCV and the media server utilizing the random session key.

8. The method of claim 7, wherein communicating the vending request from the mobile communicating device to the media server comprises:
   determining a vending machine identification number of the vending machine and a product identification number of the product;
   dialing, via the mobile communication device, at least one of a unique set of symbols and a unique set of digits and numbers, the symbols, digits and numbers being translated by a Mobile Switching Center (MSC) providing access to the mobile communication device;
   routing the translated symbols, digits and numbers to a verification server for subscriber account verification;
   forwarding user account information to a billing server for credit approval on determination of a valid subscriber account by the verification server; and
   forwarding a request by the billing server to the media server on successful credit approval, for creating a public key embedded in one or more musical tones, the musical tones being audible or non-audible.

9. The method of claim 8 wherein routing the translated symbols, digits and numbers to the verification server comprises routing the translated symbols, digits and numbers in the form of a call detail record (CDR) to the verification server.

10. The method of claim 8 wherein forwarding user account information to the billing server comprises forwarding an account number associated with the subscriber, a mobile identification number of the mobile communication device, and the at least one of a unique set of symbols and a unique set of digits and numbers to the billing server for further processing.

11. The method of claim 8 wherein the credit approval by the billing server comprises determining if the subscriber has appropriate funds in the subscriber account using the user account information.

12. The method of claim 7 wherein receiving the public key in the audio code collector and validator (ACCV) of the vending machine from the mobile communication device comprises:
   forwarding the one or more musical tones from the media server to the Mobile Switching Center (MSC) along with an indication to the MSC for sending an alert to the mobile communication device for instructing the subscriber to place the mobile communication device against an acoustic coupler of the ACCV, the alert being a text message or an audible message;
   forwarding the alert by the MSC to the mobile communication device; and
   forwarding the musical tones from the MSC to the acoustic coupler on the subscriber placing the mobile communication device against the acoustic coupler.

13. The method of claim 7 wherein generating a random session key in the ACCV comprises:
   converting the musical tones to a digital bit stream; and
   retrieving the public key that is embedded in the digital bit stream.

14. The method of claim 7 wherein communicating the random session key as an audio signal from the ACCV to the media server through the mobile communication device comprises:
   communicating the random session key as an audio signal from the ACCV to a verification server; and
   forwarding the random session key from the verification server to the media server.

15. The method of claim 7 further comprising:

receiving a purchase check code in the mobile communication device from a verification server for confirming the purchase of the product;

communicating a confirmation of the purchase from the mobile communication device to the verification server;

receiving a purchase confirmation message from the verification server, the purchase confirmation message is one of a text message or a voice message and informs the subscriber to place the mobile communication device against an acoustic coupler of the ACCV for a final transaction;

receiving a dispense code in the ACCV from the media server; and dispensing the purchased product from the vending machine based on the dispense code.

16. The method of claim 15 wherein the purchase check code is at least one of a voice message and a text message, the purchase check code informing the subscriber that the mobile device can be removed from the acoustic coupler.

17. The method of claim 15 wherein the purchase confirmation message contains information about at least one of the purchase cost, information about the account, and optional marketing information.

18. The method of claim 15 wherein dispensing the purchased product from the vending machine based on the dispense code comprises:

querying the media server by the verification server for a valid dispense code;

embedding the dispense code by the media server into an audio signal and forwarding the audio signal to the acoustic coupler through the mobile communication device; and validating the dispense code by the ACCV and forwarding the dispense code to a dispensing module for proper dispensing of the purchased product.

19. The method of claim 15 further comprising querying the billing server by the verification server for product code billing information, wherein the billing server supplies a cost associated with the desired purchased product to the verification server.

* * * * *